(12) United States Patent
Biechele

(10) Patent No.: US 9,777,774 B2
(45) Date of Patent: Oct. 3, 2017

(54) BICYCLE FRAME, BATTERY PACK, AND BICYCLE

(75) Inventor: Johannes Biechele, Munich (DE)

(73) Assignee: FAZUA GmbH, Munich (DE)

( * ) Notice: Subject to any disclaimer, the term of this patent is extended or adjusted under 35 U.S.C. 154(b) by 205 days.

(21) Appl. No.: 14/232,459

(22) PCT Filed: Jul. 13, 2012

(86) PCT No.: PCT/EP2012/063838
§ 371 (c)(1),
(2), (4) Date: Mar. 26, 2014

(87) PCT Pub. No.: WO2013/007828
PCT Pub. Date: Jan. 17, 2013

(65) Prior Publication Data
US 2014/0196970 A1    Jul. 17, 2014

(30) Foreign Application Priority Data

Jul. 13, 2011 (DE) .......................... 10 2011 079 094

(51) Int. Cl.
| | |
|---|---|
| *B62M 6/55* | (2010.01) |
| *B62M 6/90* | (2010.01) |
| *B62M 6/45* | (2010.01) |
| *F16D 1/06* | (2006.01) |
| *B62J 99/00* | (2009.01) |
| *B62K 19/34* | (2006.01) |

(52) U.S. Cl.
CPC ................ *F16D 1/06* (2013.01); *B62J 99/00* (2013.01); *B62K 19/34* (2013.01); *B62M 6/45* (2013.01); *B62M 6/55* (2013.01); *B62M 6/90* (2013.01); *Y10T 403/64* (2015.01)

(58) Field of Classification Search
CPC .. B62M 6/55; B62M 6/45; B62M 6/90; F16D 1/06; B62J 99/00; B62K 19/34; Y10T 403/64
See application file for complete search history.

(56) References Cited

U.S. PATENT DOCUMENTS

| | | | | |
|---|---|---|---|---|
| 4,871,042 A | * | 10/1989 | Hsu ........................... | B62M 6/55 180/220 |
| 5,474,148 A | * | 12/1995 | Takata ..................... | B62M 6/45 180/206.2 |
| 5,758,736 A | * | 6/1998 | Yamauchi ................ | B62M 6/45 180/206.4 |

(Continued)

FOREIGN PATENT DOCUMENTS

| | | |
|---|---|---|
| CH | 593 822 A5 | 12/1977 |
| DE | 30 18 333 A1 | 11/1980 |

(Continued)

*Primary Examiner* — Joseph Rocca
*Assistant Examiner* — Daniel Yeagley
(74) *Attorney, Agent, or Firm* — Muncy, Geissler, Olds & Lowe, P.C.

(57) ABSTRACT

An auxiliary motor, for a bicycle, includes an energy storage device for storing energy, a drive device for converting the energy stored in the energy storage device into kinetic energy and a transmission device for transmitting the kinetic energy onto a pedal crank spindle. The auxiliary motor is designed to be attached to a down tube of a bicycle at least parallel to the down tube and to power a pedal crank of the bicycle.

10 Claims, 10 Drawing Sheets

(56) References Cited

U.S. PATENT DOCUMENTS

| | | | |
|---|---|---|---|
| 5,798,702 A * | 8/1998 | Okamoto | B62M 6/45 180/220 |
| 5,806,621 A * | 9/1998 | Soda | B60L 11/1801 180/206.2 |
| 5,845,727 A | 12/1998 | Miyazawa et al. | |
| 5,853,062 A * | 12/1998 | Hulett | B62M 6/55 180/206.4 |
| 5,878,831 A * | 3/1999 | Saito | B60L 11/1801 180/206.2 |
| 5,901,807 A * | 5/1999 | Tseng | B62M 6/55 180/206.3 |
| 5,984,335 A * | 11/1999 | Tseng | B62M 6/55 180/206.4 |
| 6,276,479 B1 * | 8/2001 | Suzuki | B62M 6/45 180/206.8 |
| 7,267,352 B2 * | 9/2007 | Ishikawa | B62J 11/00 180/65.1 |
| 8,220,679 B2 * | 7/2012 | Yoshida | B60R 16/04 224/412 |
| 8,881,857 B2 | 11/2014 | Binggeli et al. | |
| 2004/0027249 A1 * | 2/2004 | Heiser, Jr. | G01R 31/3651 340/636.1 |
| 2005/0039963 A1 | 2/2005 | Forderhase | |
| 2005/0189157 A1 * | 9/2005 | Hays | B62M 6/45 180/206.2 |
| 2006/0208450 A1 | 9/2006 | Rizzetto | |
| 2011/0042156 A1 * | 2/2011 | Vincenz | B62H 5/001 180/206.5 |
| 2011/0056177 A1 * | 3/2011 | Goto | B62M 6/55 56/14.7 |
| 2012/0012412 A1 * | 1/2012 | Moeller | B62M 6/45 180/206.2 |
| 2012/0086183 A1 * | 4/2012 | Ken | B60C 19/122 280/260 |

FOREIGN PATENT DOCUMENTS

| | | |
|---|---|---|
| DE | 200 12 972 U1 | 9/2000 |
| DE | 20 2004 014 189 U1 | 11/2004 |
| DE | 10 2008 047 087 A1 | 3/2010 |
| DE | 20 2010 010 522 U1 | 11/2010 |
| EP | 0 168 905 A2 | 1/1986 |
| EP | 0 650 887 A2 | 5/1995 |
| EP | 2 230 161 A1 | 9/2010 |
| EP | 2 423 096 A2 | 2/2012 |
| GB | 2 050 270 A | 1/1981 |
| JP | H 04-358986 A | 12/1992 |
| JP | H 06-2227474 A | 8/1994 |
| JP | H08 164886 A | 6/1996 |
| JP | 2000-238675 A | 9/2000 |
| JP | 2009-248668 A | 10/2009 |
| WO | WO 03/022671 A2 | 3/2003 |
| WO | WO 2008/106976 A1 | 9/2008 |

* cited by examiner

BICYCLE FRAME, BATTERY PACK, AND BICYCLE

CROSS-REFERENCE TO RELATED APPLICATIONS

This application is a national stage of International Application No.: PCT/EP2012/063838, which was filed on Jul. 13, 2012, and which claims priority to German Patent Application No. 10 2011 079 094.2 which was filed on Jul. 13, 2011, and which are all herein incorporated by reference.

BACKGROUND OF THE INVENTION

The invention relates to a bicycle frame for building an electric bicycle and an electric bicycle with such a frame. It also concerns a battery pack for such an electric bicycle and a home training arrangement. The invention also concerns a bicycle, an auxiliary motor for a bicycle, a control unit for such an auxiliary motor and a drive adapter.

Bicycles have long enjoyed great popularity as an economical, easy to handle and emission-free means of transportation. In recent decades, they have also found mass distribution as sports or fitness equipment, and particularly suitable types of bicycles emerged for various fields of sporting application. This includes mountain bikes (MTB) in various structural forms that were especially developed for use in terrain and especially mountainous terrain in addition to racing bicycles and bicycles optimised for recreational sports use on asphalt or light terrain (road bikes, city bikes or cross bikes).

On the other hand, the fundamentally already old idea of the electric bicycle has for years now been implemented again as an attractive product ("pedelecs") and these bicycles have now experienced remarkable dispersion despite their heavy weight and high price. In particular, potential customers are older, less physically fit cyclists or cyclists who are not athletically ambitious. However, there are also sports-minded cyclists who are interested in electric bikes, whether for use on the way to work or because of the possibility of travelling further with them without overstressing their own physique and/or of increasing their travel speed.

There are very different attitudes towards pedelecs, especially among mountain bike riders, and there is hardly a market for these, in part due to the heavy weight design that hardly satisfies athletic ambitions, the poorer maneuverability and the reduced agility. Even considering visual aspects, the current pedelec designs cannot meet the expectations of ambitious athletic mountain bike riders.

DE 20 2004 014 189 discloses a bicycle with an auxiliary drive. Such auxiliary drives are usually mounted in the seat tube of a bicycle. They have a brushless DC motor and a transmission. Additionally, such auxiliary motors are connected with rechargeable batteries and control electronics. The rechargeable batteries provide such auxiliary motors with power. The rechargeable batteries of such systems are typically mounted on the outside of the bicycle, for example, in so-called saddlebags and are connected to the auxiliary motor via cables.

However, this arrangement also has a number of unwanted effects and drawbacks.

The cable connection is the first weak point of such systems. This is especially relevant for mountain bikes, which are often used in rough terrains and therefore can be subject to high impacts or external influences. For example, a saddle bag (in which the rechargeable batteries and the control electronics are mounted) can become loose from the saddle due to impacts to the bike, which in turn can interrupt the connection between the rechargeable battery, control electronics and auxiliary drive. Next, these components can be lost for similar reasons. The saddle bags, which are filled with rechargeable batteries, can also lead to injuries or damage to the bike if they fall. They can even be damaged by stone impact.

Furthermore, the attachment of additional structures, such as saddlebags for the inclusion of batteries, is undesirable for various other reasons. This can adversely affect the aerodynamics and the aesthetic appearance of the bike. For example, it may be undesirable, especially for athletic users, that others can see that they are using a bicycle with an auxiliary drive.

Furthermore, it should also be noted that the installation of such drive systems is often complicated. An inner bearing tube of a standard bearing must first be replaced with a special drive shaft. Furthermore, the drive must be mounted in the seat tube, which is only accessible after dismantling the saddle next to the seat post. A saddlebag for holding the rechargeable batteries must be installed and these rechargeable batteries must be connected to the drive in a conductive manner. Such assembly is time consuming and expensive and can in many cases only be performed by a trained specialist.

BRIEF SUMMARY OF INVENTION

Therefore, one of the objectives of this invention is to overcome the problems and disadvantages of the state of the art. In particular, one of the main objectives of the invention is to provide an auxiliary motor for a bicycle that can be easily and safely mounted and handled. Another main objective of the invention is to provide an innovative bicycle concept that coordinates the idea of electrically supported mobility with the demands of sports and lifestyle-oriented riders better than has been successful with previous electric bicycle configurations. Another preferred objective of the invention is to provide an easy-to-handle, durable, compact auxiliary motor with as few parts as possible, i.e. an appropriate bicycle.

This (these) objective(s) will be solved by the subject matter of independent claims. Preferred embodiments are found in the dependent claims and in the description.

The invention is based on the idea of designing a frame that is suitable for a conventional bicycle (which in particular can be used for leisure sports) and can be expanded in a modular manner to allow the construction of an electric bicycle. Unless explicitly stated otherwise, i.e. provided this is not functionally handed over to a specialist, the terms 'bicycle' and 'bicycle frame' will be used synonymously in the following. In other words, a bicycle frame is a necessary feature of a bicycle. At the same time, however, the term bicycle can also optionally include other elements for the frame—for example, a handlebar, wheels and other elements. Based on the specific context, it will be clear to the expert whether the described object is a bicycle in the strict sense (therefore with additional components) or a bicycle in the broader sense (therefore a bicycle frame). For example, when it is stated that an auxiliary motor is attached to the down tube of a bicycle, it certainly includes the attachment to a down tube of a bicycle frame, so that in this case the terms bicycle and bicycle frame must be understood synonymously. However, if it is further stated that additional elements are attached to the handlebars or the wheel of a bicycle, it is clear that the term bicycle also includes other objects in addition to the bicycle frame.

The objectives of the invention, for example, are met in that at least one frame segment is designed for the removable fastening device of at least one energy storage device, especially of a preconfigured battery pack, and has fastening devices or openings for safely fixing or installing such energy storage devices. According to one aspect of the invention, the frame segment is also adapted for receiving additional parts of the electric drive, especially a motor-transmission-unit and optionally also the appropriate control electronics.

According to another, relatively independent aspect of the invention, a bottom bracket shell is provided, which is designed for the alternative mounting of a conventional pedal bearing or bottom bracket or a (typically large displacement) pedal bearing motor. "Pedal bearing motor" or "bottom bracket motor" should particularly be understood here as connected motor-transmission combination, which drives the rear wheel (generally via a normal chain operation), whereby a conventional derailleur gear can also be allocated to the rear wheel.

The invention can be universally used in all types of mountain bikes (especially in only spring-loaded—so-called hard tails—as well as the fully spring-loaded—so-called fullies), but also in other bicycles—with a relevant different frame design in detail. It allows for the design of wheels that largely combine the advantages and riding characteristics of a classic bicycle and an electric bicycle in one. Such a bicycle can close the gap between conventional, purely muscle-powered bicycles and electric bicycles via an innovative component synthesis of bicycle and electric drive, whereby both systems are combined in a modular manner.

The bicycle of the invention is also designed in its frame structure so that the user can easily convert it from a bicycle (specifically MTB) into a pedelec. A single bicycle type thereby addresses several customer groups and interest shifts are stimulated toward the (supporting) electric drive in the bicycle. Since the bicycle of the invention hardly differentiates from other modern and sporty designed bicycles, the structure meets the sporty and lifestyle demand of a wide range of user groups. The potentially inconspicuous integration of the electric drive also provides the much-desired "understatement" as regards the drive concept.

Since the frame or the bicycle can be sold in the standard model without an electric drive, a base price is possible close to the price of a conventional frame or bike, which simplifies an entry into the modular concept for the user. The user then enters the world of electrically supported mobility with the subsequent acquisition of a motor or a motor-transmission assembly and battery pack (rechargeable battery) that can be retrofitted, without inhibiting a return to a pure muscle operation of his or her bicycle. The bicycle can be individually used either with or without a drive, even adjusting to the current form of the day, a touring plan or the general training status. It is also the customer's choice of when or if he or she decides to switch to the electric drive.

Since this drive concept is intended to be used from cross-country to free riding, the target group is also accordingly widely disbursed. The extreme biker should be afforded even more fun in the biking sport. The touring rider should be able to optionally extend his range with the drive. Even users who are physically restricted or cannot relinquish an additional drive due to physical problems should find a pleasant companion in this bike. In particular, those customers who are undecided regarding the pedelec should be provided with an incentive to buy based on the equipment option of this concept.

In an embodiment of the invention, a frame segment designed as a fastening device or support of an energy storage device and possibly also as a motor-transmission-unit comprises a U-profile or T-profile that is essentially open toward the bottom. In addition to high mechanical stability, both profile forms also offer high versatility regarding the attachment of various powerful and therefore variably dimensioned battery packs when using simple fastening devices. The U-profile also provides an easy installation of a motor-transmission unit. However, in addition to these currently available advantageous profile forms, others are generally also possible. Furthermore, the down tube is designed for the fastening device of an energy storage device and possibly also a motor-transmission unit while the remaining frame tubes have the conventional structure.

In respect to the exact construction and dimensioning, the recommended frame can be designed as mountain bike frame of the hard tail or the full suspension model. The invention can also be implemented in a street bike frame and therefore ultimately result in a touring, city or cross bike or other modern bicycle model that can be upgradeable to an electric bicycle.

In another embodiment of the frame, an adapter ring is provided for fitting a mechanical pedal bearing into the larger dimensioned bottom bracket shell in view of the larger diameter of a current electric drive bottom bracket shell. In future implementations, which are customised for potentially more compact bottom bracket motors, such an adapter ring can be foregone.

In another embodiment, the frame is modified in the area of the bottom bracket shell so that it offers more space for an additional gear that is seated on the bottom bracket axle, which meshes with the drive sprocket of a motor-transmission unit that is seated in the open frame segment.

Another embodiment of the invention provides that there is at least one opening for housing a contact between an installed battery pack and the bottom bracket motor. The opening is located in the bottom bracket shell close to the connecting point of the respective frame section that is designed for the fastening device of an energy storage device. Cable harness connections can be conveniently avoided between the energy storage and the motor by means of plug-in contacts and a final conversion from a purely human-powered bicycle to a bicycle that operates with electric support can therefore be accomplished.

In an advantageous design of the electric bicycle, a control unit with a wireless transmission unit can be mounted on a bicycle handlebar and a wireless receiving unit can be mounted to the drive unit or pedal bearing motor to receive the control signals. This design also contributes to a high reliability of the overall structure and to its flexibility, since the routing and the case-by-case shutdown or removal from the connecting cable is omitted.

The battery pack proposed with the invention has a battery case, specifically made of plastic, and constitutes a moisture-tight structure, which is designed for safe attachment to the proposed bicycle frame, and therefore hereby has suitable fastening means or openings for the engagement of the fastening means provided on the frame. To facilitate a recharge on an interior socket or a replacement, locking or latching devices or snap-in closures are preferred. However, easy-to-use screw connections, elastic tension belts and the like can also be used alternatively.

From practical as well as aesthetic viewpoints, the basic shape of the battery pack is preferably prismatic as currently viewed. Particularly it is a rectangular shape. However, deviating basic shapes can also be advantageous for certain applications, perhaps that of an obliquely truncated pyramid or a cylinder or a cylinder section. If the motor-transmission unit together with the battery pack must be seated in the open frame section, it is preferably also shaped prismatic, possibly also cylindrical, and matched to the dimensions of the battery pack.

Another design offers expanded potential use, in which a charging control unit for the pedal bearing motor and the battery pack is assigned for the generator operation of the pedal bearing motor to recharge the battery pack, particularly in a design in which freewheel agents are provided for uncoupling the pedal bearing motor from the rear wheel during the generator mode. The user can ride such a bike in riding conditions with a low pedaling force requirement (such as when riding downhill or riding with tailwind support) in a charging mode and hereby expand the operational range. On the other hand, specifically in a home training arrangement, a dual useful home trainer use is possible: on one hand as fitness training and on the other, as completely emission-free recharging of the batteries.

The invention includes the following aspects, which solve the objectives of the invention.

1. Auxiliary motor for a bicycle, wherein the auxiliary motor has an energy storage device for storing energy,
    a drive device for converting the energy stored in the energy storage device into kinetic energy, and
    a transmission device for transmitting the kinetic energy to the pedal-crank spindle,
    wherein the auxiliary motor is designed to be attached on a down tube of a bicycle and at least be attached essentially parallel on the down tube and drive a pedal crank of the bicycle.

Such a designed auxiliary motor, which particularly comprises the energy storage device and is or can be assembled or mounted on a down tube of a bicycle, represents a compact unit. It is particularly of an advantage that such a motor can be designed compactly and does not require any cables with external components (for example, external energy storage devices). This solves the objective of the invention, specifically of the objective of the first aspect.

2. Bicycle with an auxiliary tube according to aspect 1, wherein the auxiliary motor is attached on a down tube of the bicycle.

Of course, it is also especially preferred to provide a suitable bicycle.

3. Bicycle with an auxiliary motor according to one of the previous aspects, wherein the energy storage device and the drive device can be successively positioned in longitudinal direction and the energy storage device and the drive device combined do not project over the length of the down tube.

Due to such a configuration, the compact and easy-to-handle design of the invention continues to be further guaranteed, which can have advantageous effects on the aerodynamics and may be desirable under aesthetic aspects.

4. Bicycle and/or auxiliary motor according to one of the previous aspects, wherein the auxiliary motor does not exceed a width of 9 cm, preferably 7 cm, and especially preferred not to be exceeded is 5 cm in a random section level perpendicular to the longitudinal direction.

A limitation of the dimensions in a lateral direction as well as the geometric configuration, for example with rounded corners or a half-oval, can contribute to an advantageous aerodynamic and aesthetic design of the inventive object.

5. Bicycle or auxiliary motor according to one of the previous aspects, wherein the energy storage device is designed for storing electric energy and preferably has at least one battery, a battery pack, a rechargeable battery and/or a rechargeable battery pack.

Although other energy storage devices are conceivable, it is particularly preferred that the energy storage device is formed in the shape of batteries and/or accumulators. This can guarantee easy handling and advantageous operation.

6. Bicycle or auxiliary motor according to one of the previous aspects, that also has a housing, which is designed
    to at least partially surround the energy storage device and the drive device in a circumferential direction and
    at least essentially completely cover or span the energy storage device and the drive device in a longitudinal direction.

Such a housing can protect various elements of the auxiliary motor, in particular the energy storage device, the drive device and the transmission device—particularly against dirt, such as whirled up dirt. Such a housing can protect against the effects of liquids, particularly water (i.e. rain water and splashing water when riding) and also against impacts, for example, from small stones, which are whirled up while riding. In addition, such a housing can further improve the aerodynamic and/or aesthetic characteristics.

Such a housing, which can also include parts of the down tube, must not be continuous, even if this is preferred. According to other preferred embodiments, such a housing can also include holes and open spaces. For example, providing such structures can be useful if the auxiliary motor must be vented and/or cooled.

7. Bicycle or auxiliary motor according to aspect 6, wherein the housing comprises plastic or resin, fibre composites, particularly carbon and/or aluminium.

Such materials can be especially advantageous, since they have a relatively great strength or rigidity on one hand and otherwise are relatively light and therefore do not essentially increase the overall weight of the bicycle or of the auxiliary motor.

8. Bicycle or auxiliary motor according to one of the aspects of 6 or 7, wherein the housing is designed to be attached at several points, preferably at three, four or five points of the down tube of the bicycle.

More preferably, such an attachment of the housing on the down tube of the bicycle provides a simultaneously simple, user-friendly and also easy assembly or attachment and dismantling of the respective auxiliary motor on the bicycle. The auxiliary motor is connected with the frame in a replaceable manner. It is preferred to have a panel that visually matches the frame or is structurally identical. This can fill the recess in the down tube during the conventional MTB-mode. This panel is preferably a half shell, similar to the outer shell of the drive. The panel is preferably designed so that it can be used as storage space for tools or supplies. This preferably increases the customer benefits.

9. Bicycle or auxiliary motor according to one of the previous aspects, wherein the housing of the auxiliary motor has indentations, preferably 3 indentations, for attaching the auxiliary motor on the bicycle, which preferably has an elastic attenuation or suspension comprising rubber and comprises a harder abutment area located above the attenuation, which, for example, comprises metal, particularly aluminium, and wherein the down tube of the bicycle preferably has projections, which are designed to connect with the indentations and hereby attach the auxiliary motor to the down tube of the bicycle.

Such a configuration of mounting the housing to the down tube of the bicycle can also contribute to an easier, user-friendly and safe handling.

10. Bicycle or auxiliary motor according to one of the previous aspects, wherein the auxiliary motor and particularly a housing is configured to form a smooth transition with the down tube, particularly so that the combination of the auxiliary motor and down tube is similar or identical to the down tube of a conventional bicycle.

In particular, a smooth transition designates a continuous transition or a transition in which the transitioning elements (here: housing and down tube) essentially transition directly or are flush. A maximum distance between the transitioning elements preferably equals no more than a few millimeters and it is particularly preferred to be less than one millimeter. The shape of the housing is in particular preferably adjusted to that of the down tube or reverse, so that the impression of a smooth transition is further increased. Preferably, a seal is provided on the frame and/or housing, which seals the two parts against each other. Providing a smooth transition can further improve the aerodynamic characteristics in comparison to the solution of the state of technology. Such a solution can also be especially attractive visually and aesthetically, so that a bicycle with an auxiliary drive cannot be differentiated or can only be differentiated with difficulty from a standard bicycle. This can further contribute to an acceptance of such an auxiliary motor or such a bicycle.

11. Bicycle or auxiliary motor according to one of the previous aspects, wherein the auxiliary motor has a freewheel mechanism, which preferably is arranged in the transmission device.

Providing a freewheel mechanism is especially preferred, since the rotation of the motor can hereby be uncoupled from the rotation of a crank axle. This is especially desirable when a bicycle user sets the crank axle into motion without the motor contributing to the movement.

12. Bicycle or auxiliary motor according to one of the previous aspects, wherein the entire auxiliary motor is shorter in a longitudinal direction than a length of the bottom tube or does not exceed a length of 80 cm, preferably 70 cm, and more preferably 60 cm.

Such a limitation of the auxiliary motor dimensions contributes further to the compact configuration of the auxiliary motor.

13. Bicycle or auxiliary motor according to one of the previous aspects, wherein the auxiliary motor is designed to convert motion or kinetic energy that is transferred to the drive device via a pedal-crank spindle and the transmission device into stored or storable energy and store it in the energy storage device.

In other words, the motor can therefore convert kinetic energy into electric stored energy according to this configuration. This, for example, may be used so that a user charges the energy storage device by moving a crank shaft without achieving a distance gain—for example, a user could "jack up" an appropriate bicycle at home or support a rear wheel so that a rotation of a powered rear wheel does not result in a progression of the bicycle. Then the energy provided by the user could be converted into stored energy and could be stored. In an especially preferred configuration, the user can set the performance that should be stored (such as the wattage) so that he can control its load application here. Furthermore, the storage can thereby preferably also be charged during the ride.

14. Control unit for an auxiliary motor or for a bicycle according to one of the previous aspects, wherein the control unit has a (rotational) speed as control figure and is configured to record the progression or change over time of the energy used by the auxiliary motor and, preferably based on the recording or evaluation, determine if the auxiliary motor alone supports a load to maintain the speed.

Such a control unit must only collect the timed consumption of energy and therefore the power. For example, this may occur by measuring the current (consumption) in an electric auxiliary motor. However, the control unit can therefore be configured very simple and compact and contribute to the compact and simple structure and control of the auxiliary motor or bicycle.

The auxiliary motor according to the invention can basically be configured to only deliver performance if a user carries a part of the load that is required for movement. In such a case, a control unit can be designed as described to determine if the auxiliary motor supports a load to maintain a speed. In other words, it determines if or that the user himself is providing power, i.e. is pedaling. This may occur, for example, as follows.

The auxiliary motor is set at a particular speed. In order to maintain this speed, a certain load or power is required (150 watts will be used as an example). This is partially provided by the motor and partially by a user. The power provided by the user is primarily not constant. The force that a user exerts on the pedals of a bicycle varies greatly over time: It is minimal in the position in which the pedals are at their highest and lowest point and maximal at the location where the pedals essentially assume the same height. Between these extremes, the force essentially progresses sinusoidally. In order to achieve a defined speed, an essentially constant total load or total power must be provided. The power provided by the motor is generally calculated from the desired total power minus the power provided by the user. If the power provided by the user now varies in time, for example is sinusoidal, the power provided by and consumed by the motor also varies in time, for example is sinusoidal.

The power consumed by the auxiliary motor or the electric current consumed by the auxiliary motor can be used to determine if the auxiliary motor alone can carry a load to maintain a speed.

In an especially preferred configuration, the control unit is designed to switch off the auxiliary motor or emit a warning signal, if it detects that the auxiliary motor carries a load alone to maintain a speed over a particular, preferably pre-set, time.

15. Control unit for an auxiliary motor or a bicycle according to aspect 14, wherein the control unit controls a power or output provided by the auxiliary motor depending on a physiological load parameter.

Preferably, the physiological load parameter is the pulse or the heartbeat of a user. It is also preferred that the power provided is controlled so that it increases with the increasing load by the user. For example, it can be preferred that the user is assigned a particular load range with load limits. If the user is below the lower load limit, the auxiliary motor provides no power. If the user is above the maximum load limit, the motor provides power. The user can hereby train within his pre-set load range.

The control unit can preferably also include a slope inclination sensor, which can detect the inclination of a traveled slope. In that case, it is especially preferred that the control unit controls power provided by the auxiliary motor depending on the inclination of the traveled slope. The control unit, for example, can be designed so that it controls the power provided by the auxiliary motor so that it contains the retrieval of high or maximum power on a slope with great inclination. Such a control unit, for example, can be useful, especially since the load parameters of a user, such as the pulse, only adjust to a load with a certain delay (i.e. at approx. 20 to 30 seconds). It can therefore be useful to also provide a control of the current route conditions, specifically the current inclination, instead of or in addition to a pure control system of physiological load parameters.

16. Auxiliary motor or bicycle according to one of aspects of 1 to 13 with a control unit according to one of the aspects of 14 or 15.
17. Drive adapter for creating an effective or operative connection between an auxiliary motor according to one of the aspects of 1 to 13 or 16 and a pedal crank spindle of a bicycle, preferably according to one of the aspects 2 to 13 or 16, wherein the drive adapter has a hollow axle, which is designed to coaxially surround a partial area or portion of the pedal-crank spindle or be plugged onto it, has a gear that is configured to be effectively engaged or operatively connected with a pinion, particularly a drive or output pinion, and has a flange for the attachment on a pedal crank, preferably on a sprocket (Wheel)

wherein the gear is connected with the hollow axle and wherein the flange and gear are preferably arranged on facing ends of the hollow axle.

Such a drive adapter also contributes to a simple configuration of a bicycle with a relevant auxiliary motor. Other than for systems that are known from the state of the art, the respective components do not have to be replaced in a time-consuming and costly manner, but rather the respective adapter can be used with standard components. This drive adapter, specifically in combination with the objects of the other independent aspects, therefore solves the objective of the invention.

17a. Drive adapter according to aspect 17, wherein the connection between the gear and the hollow axle is configured in one piece or is integral.

An especially simple, safe and strong connection can be achieved by such a configuration, which makes the adapter especially resistant.

17b. Drive adapter according to aspect 17 or 17a, wherein the hollow axle has an external thread and the gear has a corresponding inner thread for the connection with the hollow axle.

This preferably provides an easy as well as secure attachment of the gear to the hollow axle, wherein the thread is preferably designed so that it can be released against the operating direction of rotation.

17c. Drive adapter according to one of the aspects 17 to 17b, wherein the connection between the gear and the hollow axle is made by several threaded screws.

These preferably extends between a cross-piece or web of the hollow axle and an outer surface of the gear essentially perpendicular, preferably vertical, to the rotational axis and/or the symmetrical axis of the gear.

A drive adapter is also preferred, in which the connection between the gear and the hollow axle is created via a contact of an outer surface of the gear that is perpendicular to a symmetrical axis of the gear.

Compared to the state of the art, this configuration offers an especially strong and good contact between the gear on one hand and the hollow axle on the other. It is especially preferred that the hollow axle have a one-piece, connected or integrally configured collar area on which the gear can be fastened via a contact to an outer surface vertical to its rotational axis.

17d. Drive adapter according to one of the aspects 17 to 17e, wherein the gear is preferably configured as an axle drive gear or crown gear.

17e. Drive adapter according to one of the aspects 17 to 17d, wherein the hollow axle exceeds the width of a bottom bracket shell preferably by at least 10 mm, preferably by at least 20 mm and particularly by at least 30 mm.

This occurs preferably in reference to or in co-ordination with the width of the bottom bracket shell, wherein currently standard widths of 68 mm and 73 mm are used for bottom bracket shells.

17f Drive adapter according to one of the aspects 17 to 17e, wherein the inner diameter of the hollow axle is so that the pedal-crank spindle can be installed true to size or with zero clearance in the hollow axle and preferably equals approximately 24 mm.

17g. Drive adapter according to one of the aspects 17 to 17f, wherein the flange does not exceed a depth of 10 mm, preferably 8 mm, further preferred 6 mm and especially preferred 4 mm.

17h. Drive adapter according to one of the aspects 17 to 17f, wherein the flange has a width perpendicular to a rotational axis or a symmetrical axis between 25 mm and 100 mm, preferably between 30 mm and 90 mm, especially preferred between 40 mm and 80 mm, and particularly between 50 mm and 60 mm.

17i. Drive adapter according to one of the aspects 17 to 17h, wherein the flange in a top view perpendicular to its symmetrical axis has an essentially star-shaped form with several extensions that are distributed around the circumference, wherein preferably 3, 4, 5 or more extensions preferably have a width of 20 mm to 30 mm.

18. Drive adapter according to one of the aspects 17, wherein an outer circumferential section of the drive adapter is—in a perpendicular sectional plane relative to the longitudinal axis of the drive adapter—configured untrue, positive interconnection and especially preferred as multitooth or is polygonally rounded, for example is rounded three, four or five times, and wherein the flange has an opening with a corresponding profile so that a force transmission from the hollow axle to the flange and reverse is possible.

Compared to the round configurations of the outer profile, an untrue or out of round configuration provides an especially advantageous engagement into other elements, especially the flange.

The untrue configuration, for example, can be implemented by the appropriate milling of the shaft.

The experts will understand that, whenever a reference to aspect 17 is indicated, this also automatically includes the references to the other aspects of 17a, etc.

18a. Drive adapter according to aspect 18, wherein the outer circumference profile is untrue over a length of at least 10 mm, preferably at least 20 mm and specifically at least 30 mm and provides a positive interconnection.

19. Drive adapter according to one of the aspects 17 or 18, wherein the flange can be fastened on the pedal crank via screws.

The flange is preferably screwed onto the pedal crank on the sprocket, wherein existing threaded holes available on the pedal crank, which also are used to fasten the sprockets, are used. The pitch circle diameter is preferably used for the adapter-flange attachment, which is provided for the smallest or largest sprocket. Mounting on a medium sprocket is also possible.

20. Bicycle to be used with an auxiliary motor according to one of the previous aspects, wherein the auxiliary motor is mounted or can be mounted to a bottom tube of the bicycle.

21. Bicycle according to one of the aspects 2 to 13, 16 and 20, wherein a bottom tube structure results from the combination of the auxiliary motor and bottom tube, which does not exceed a width of 9 cm, 7 cm, 5 cm in a random sectional plane perpendicular to the longitudinal axis of the bottom tube.

This again results in a suitable stability of the bicycle on the one hand and positive aerodynamic and aesthetic aspects on the other.

22. Bicycle according to one of the aspects 2 to 13, 16 and 20 to 21, wherein the bottom tube of the bicycle is configured to receive an auxiliary motor according to one of the aforementioned aspects, and preferably to form a smooth transition with the auxiliary motor, particularly so that the combination of auxiliary motor and bottom tube is similar or identical with the bottom tube of a conventional bicycle.

23. Bicycle according to one of the aspects 2 to 13, 16 and 20 to 22, wherein the bottom tube of the bicycle has a smooth and/or planar surface adapted for attaching the auxiliary motor.

It is also possible that the surface is not smooth. A section perpendicular to the bottom tube axis can also be a sprocket, a circular arc, or a trapeze. Optimal space utilisation in the bottom tube on one hand and a stability-increasing bottom tube can also be achieved by a suitable configuration of the profile.

24. Bicycle according to one of the aspects 2 to 13, 16 and 20 to 23, wherein the bottom tube is supportive, even without any additional elements, specifically without an auxiliary motor.

25. Bicycle according to one of the aspects of 2 to 13, 16 and 20 to 24, wherein the bottom tube is designed U-shaped or T-shaped and/or has a recessed area, and wherein the bottom tube is designed for receiving the auxiliary motor.

The invention preferably also includes a panel or an empty housing, which can cover or fill the recessed area or a recess in the bottom tube. Such a panel can be used if a bicycle will be used without a motor or in a "normal mode." This panel preferably has a half shell, which can be similar to the housing of an auxiliary motor. When using such a panel, the space that forms between the panel and the bottom tube can also be used as storage space for tools and/or supplies. This results in an additional benefit for the rider, who can use corresponding bicycle with or without, an auxiliary motor.

A1. Bicycle or bicycle frame, preferably according to one of the aspects 2 to 13, 16 and 20 to 25, with at least one frame section that is configured for a removable support of a separate energy storage and/or an energy storage device, particularly a battery pack, and has fastening devices and/or openings for inserting such for fixation/mounting the energy storage, and
a bottom bracket shell, which is designed for an alternative mounting of a bottom bracket motor or a mechanical bottom bracket, particularly in conjunction with an adapter ring.

A2. Bicycle or bicycle frame according to one of the aspects 2 to 13, 16 and 20 to 25 and A1, wherein the or a frame section designed for supporting an energy storage has a U-profile or T-profile that is specifically open toward the bottom.

A3. Bicycle or bicycle frame according to one of the aspects 2 to 13, 16 and 20 to 25 and A1 to A2, wherein only the bottom tube is configured to support an energy storage.

A4. Bicycle or bicycle frame according to one of the aspects 2 to 13, 16 and 20 to 25 and A1 to A3, wherein at least one opening is provided for housing a contact between an inserted battery pack and the bottom bracket motor in the bottom bracket shell near the connecting point of the frame section that is configured for the support of an energy storage.

A5. Bicycle or bicycle frame according to one of the aspects 2 to 13, 16 and 20 to 25 and A1 to A4, provided with an adapter ring for fitting a mechanical bottom bracket into the bottom bracket shell.

A6. Bicycle or bicycle frame according to one of the aspects 2 to 13, 16 and 20 to 25 with at least one frame section that is configured for the removable support of a separate energy storage, particularly a battery pack, and a separate motor-transmission unit and has fastening devices and/or openings for inserting such for the attachment of the energy storage and the motor-transmission unit.

A7. Bicycle or bicycle frame according to aspect A6, with a bottom bracket shell that is designed for receiving an additional drive wheel for the engagement with a pinion of the motor-transmission unit.

A8. Bicycle or bicycle frame according to one of the aspects 2 to 13, 16 and 20 to 25 and A1 to A7, designed as mountain bike frame of the hard tail or full suspension type.

A9. Battery pack for use in a bicycle or bicycle frame according to one of the aspects 2 to 13, 16 and 20 to 25 and A1 to A8 with a battery case comprising fixation means particularly snap-in means and/or openings for receiving such for insertion into a frame section designed therefor.

A10. Battery pack according to aspect A8, wherein the battery case has the basic form of a prism, specifically a block.

A11. Battery pack according to aspect A9 or A10, wherein the battery case or a part of it is designed to house a motor-transmission unit with batteries.

A12. Set of battery packs according to one of the aspects A9-A11 with various storage capacities and at least dimensions that correspond insofar that the battery packs of the set can be inserted in the same bicycle frame and attached there.

A13. Electric bicycle with a bicycle or a bicycle frame according to one of the aspects 2 to 13, 16 and 20 to 25 and A1 to A8, a bottom bracket motor and a battery pack according to aspect A9 or A10.

A14. Electric bicycle according to aspect A13, wherein the battery pack is connected with the bottom bracket motor via a plug-in contact.

A15. Electric bicycle according to aspect A13 or A14, wherein the bottom bracket motor has a concentric motor-transmission arrangement with the bottom bracket axle.

A16. Electric bicycle according to one of the aspects A13-A15, wherein a charging control unit for the generator operation for recharging the battery pack is arranged for the bottom bracket motor or the motor-transmission unit and the battery pack.

A17. Electric bicycle according to aspect A16, wherein freewheel means are provided for uncoupling the bottom bracket motor or the motor-transmission unit of the rear wheel in the generator operation.

A18. Electric bicycle with a bicycle frame according to aspect A6 or A7, a motor-transmission unit and a battery pack that can be installed in the frame according to aspects A9-A11.

A19. Electric bicycle according to one of the aspects A13-A18, wherein a control unit with a wireless transmission unit to be attached to the handlebar and a wireless receiving unit for receiving the control signals is provided on the bottom bracket motor or the motor-transmission unit.

A20. Home training arrangement with an electric bicycle according to one of the aspects A16-A19 and a floor stand that is designed to set up the electric bicycle for a home training operation.

BRIEF DESCRIPTION OF THE SEVERAL VIEWS OF THE DRAWINGS

Advantages and functionalities of the invention result from the following description of design examples based on figures. These show.

DETAILED DESCRIPTION OF THE INVENTION

Figure 1:
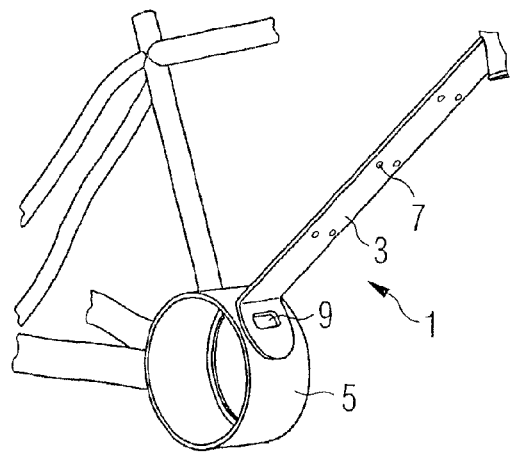
FIG. 1 a simplified, perspective detailed view of a bicycle frame according to the invention, FIG. 2 a perspective exploded view of the bicycle frame according to FIG. 1 together with the bottom bracket motor and a battery pack, FIG. 3 a view of the bicycle frame equipped with the bottom bracket motor and the battery pack, FIGS. 4A and 4B schematic diagrams (detail views) of two additional designs of the frame according to the invention, FIG. 5 a schematic illustration of a set of battery packs, FIG. 6 a schematic illustration of a design example of the electric bicycle according to the invention in a home training arrangement, FIG. 7 a schematic illustration of an additional design example of the bicycle frame according to the invention, FIG. 8 a schematic perspective illustration of the arrangement of the drive components for this configuration, FIG. 9 a perspective illustration to explain the interface between the drive and bottom bracket axle and FIG. 10A to 10D schematic diagrams of design configurations in the area of the battery pack or the motor-transmission unit.

FIG. 1 shows (partially cut) a bicycle frame 1, whose bottom tube 3 is configured as a flat or belt profile, which expands in width from the control tube to a bottom bracket shell 5 and has multiple mounting openings 7 for fixation of a battery pack. The remaining frame tubes are configured conventionally. The bottom bracket shell 5 has a larger diameter compared to the conventional bottom bracket shell and also a greater width and comprises an opening 9 near the connecting point of the lower frame tube 3.

Figure 2:
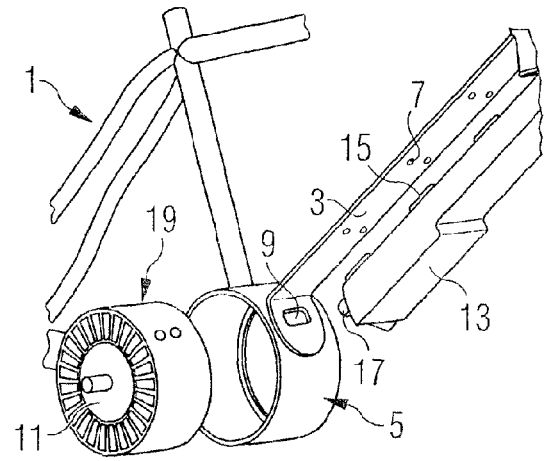
Figure 3:
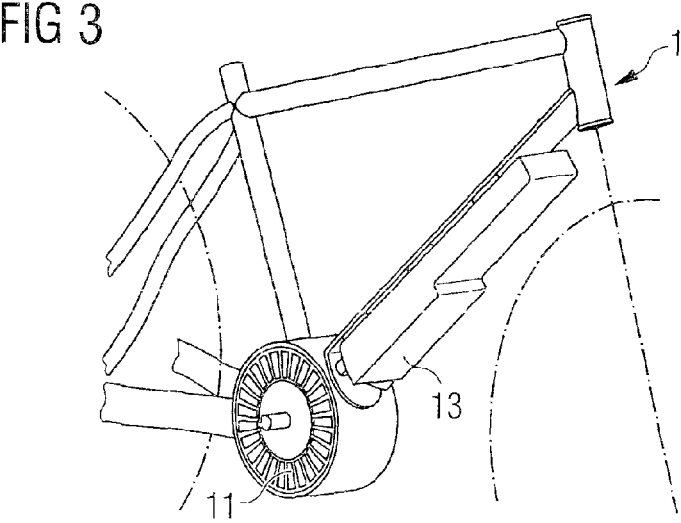

FIG. 2 shows this frame together with a bottom bracket motor (or an electric motor transmission unit) 11 and a battery pack 13 before their insertion into the frame. The battery pack 13 has in its position to the openings 7 on the lower frame tube 3 corresponding fastening devices 15 and a contact section 17 on its lower front surface. A contact section 19 can also be seen on the bottom bracket motor 11. Fastening means for fixation of the bottom bracket motor in the bottom bracket shell 5 are not shown in the figure. The contact sections 17 and 19 on the battery pack or the motor are placed and shaped so that they create a direct electric contact (plug-in contact) between the motor and its power supply through the opening 9 in the bottom bracket shell 5 without requiring a cable. FIG. 3 shows the ready-mounted bicycle frame 1 with the installed bottom bracket motor 11 and the battery pack 13.

Figure 4A:
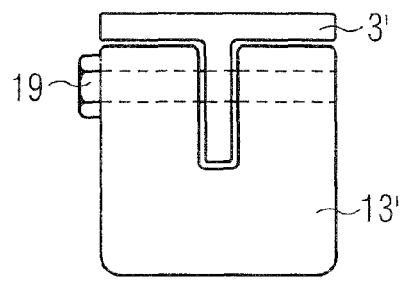
Figure 4B:
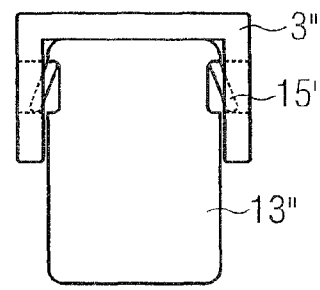

FIGS. 4A and 4B show that a T-profile 3' with a battery pack 13' adjusted in its cross-section and separate fastening screws 19 (FIG. 4A) or a U-profile 3" with an adjusted battery pack 13" with laterally moulded snap-on picks 15' can be used in place of the flat profile described further above.

Figure 5:
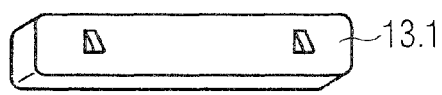
Figure 5:
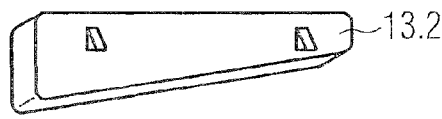
Figure 5:

FIG. 5 shows three battery packs 13.1, 13.2 and 13.3 for use in a design adjusted bicycle frame, which have identically configured and arranged (not separately described) fastening means, but various volumes and therefore also various storage capacities and together form a set of battery packs, from which the user can select what he requires.

Figure 6:
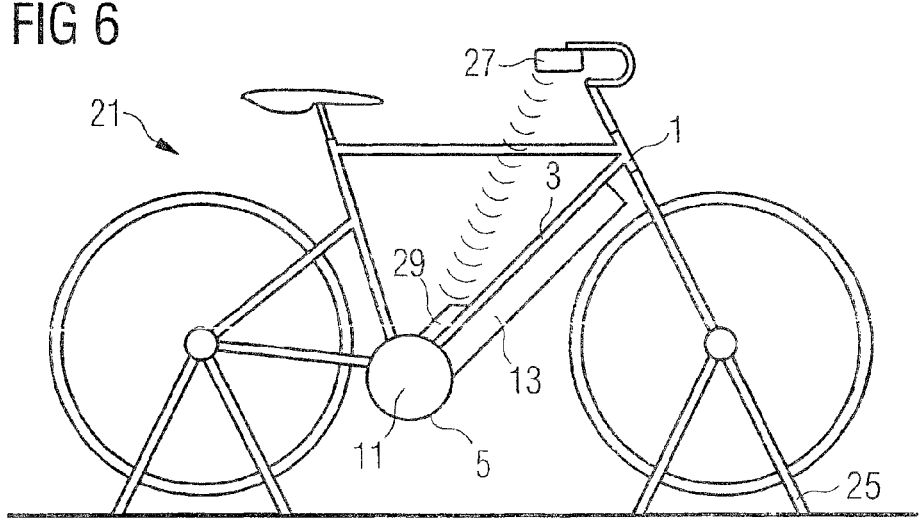

FIG. 6 shows a schematic drawing of a home training arrangement 21 with an electric bicycle in a floor stand 25 according to the invention, in which the bike is supported without any floor contact of the wheels. In addition to the parts of the bottom tube 3 and bottom bracket shell 5 and the assembly components of bottom bracket motor 11 and battery pack 13 already shown in other figures and explained further above, a control unit 27 mounted on the handlebar with a wireless transmitting unit (not separately described) and a wireless receiving unit 29 mounted at the bottom bracket motor for receiving control signals can also be seen here. The control unit includes a charging control unit for the generator operation of the bottom bracket motor 11, specifically for home operation in the arrangement shown.

Figure 7:
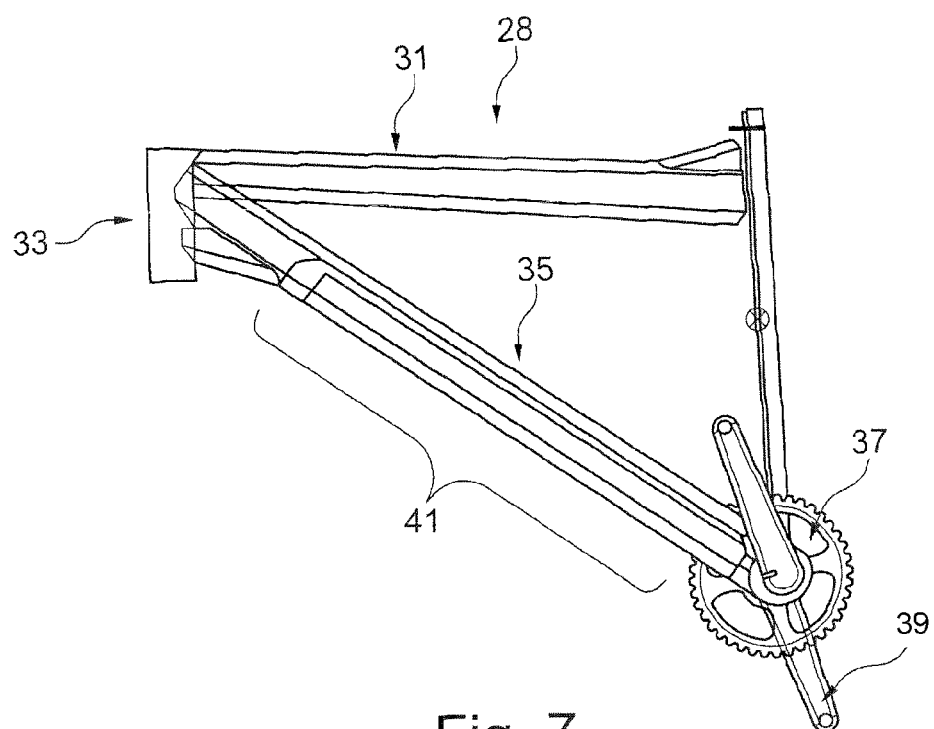
Figure 8:
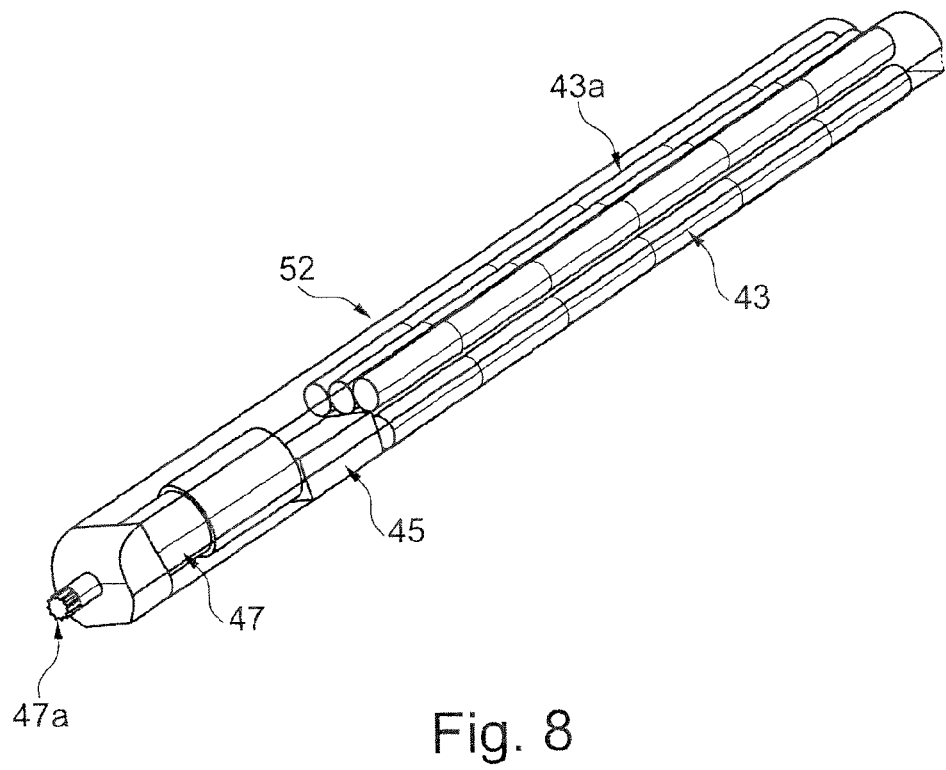

As essential parts of another bicycle or bicycle frame 28 of the invention, FIG. 7 shows its top tube 31, control tube 33 and bottom tube 35 together with the bottom bracket 37 with an installed pedal crank 39. Here, the bottom tube 35 is open to the bottom over the larger area over its length and essentially incorporates these all components of a auxiliary motor. This auxiliary motor is in the depicted example designed as an electric motor or electric drive 41. Its structure is illustrated in more detail in FIG. 8. The electric drive thereby includes an energy storage device, which is designed here as rechargeable battery pack 43. This rechargeable battery pack comprises multiple standard rechargeable batteries 43a, which are packed successively and next to each other in longitudinal direction. Furthermore, the electric drive 41 includes an electronic assembly 45 and, at the lower end facing the bottom bracket shell, a drive device and a transmission device, which in the shown embodiment are configured as a motor-transmission unit 47. In addition, the depicted embodiment includes a pinion 47*a*, which can be designed as an output pinion or drive pinion. Furthermore, the embodiment shown also has a housing 52, which is configured to surround the auxiliary motor and protect it against dust, splashing water, dirt, whirled up particles and/or impacts.

Figure 9:
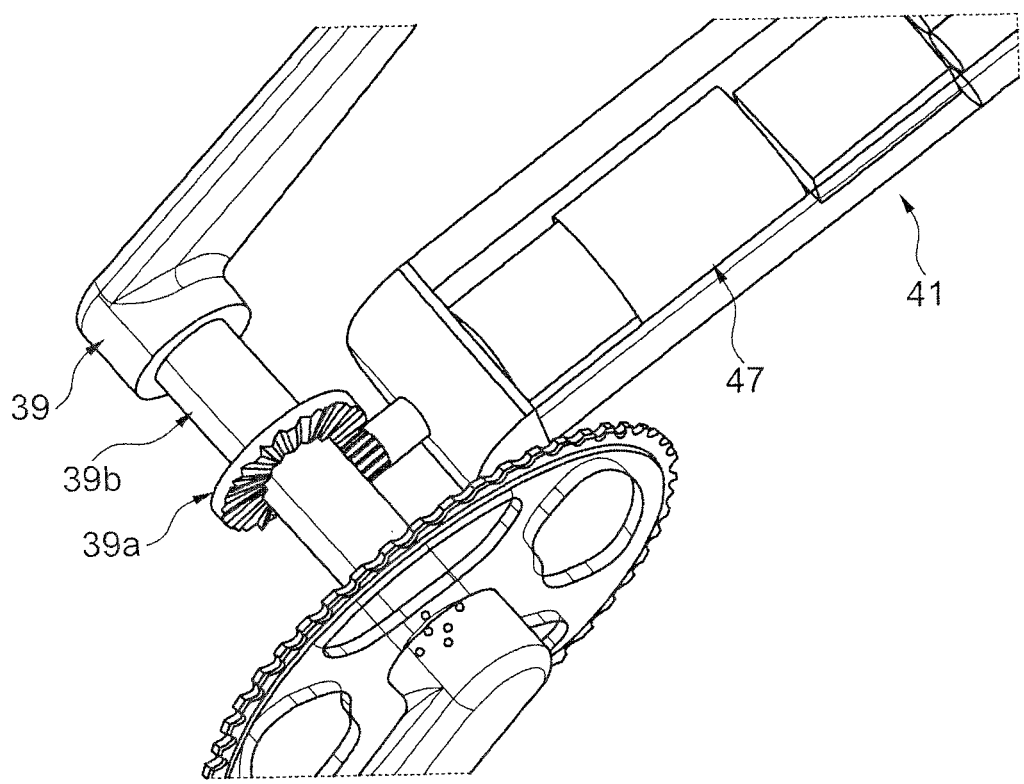

FIG. 9 more precisely shows the mechanical connection between the electric drive 41 and the pedal crank 39 as a detailed view. It can be seen that the pinion 47*a* of the motor-transmission unit 47 meshes into a special front toothed gear 39*a* on the pedal crank axle 39*b*. In a variation of this configuration, the gear on the pedal crank side can also advantageously be designed to be placed near the sprocket or possibly be integrated with it, whereby essentially structural interventions in the bottom bracket shell can be prevented. In a variant, an additional transmission element to the drive pinion of the motor-transmission unit is to be provided.

Figure 10A:
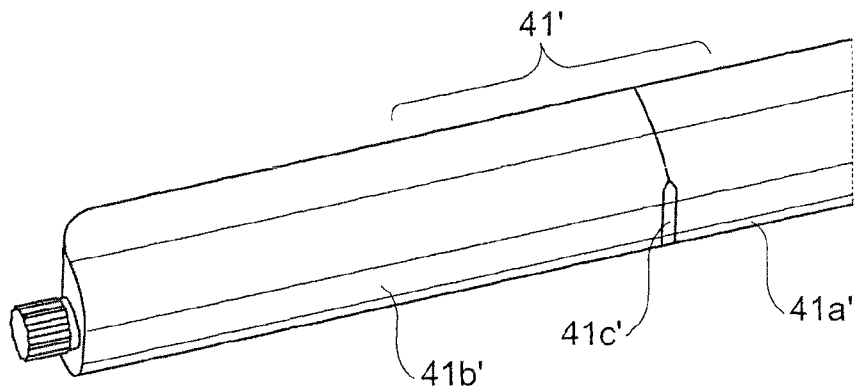
Figure 10B:
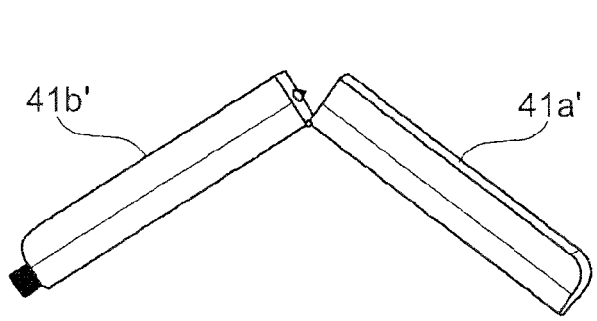
Figure 10C:
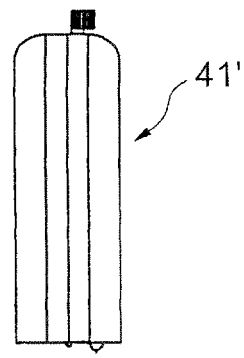
Figure 10D:
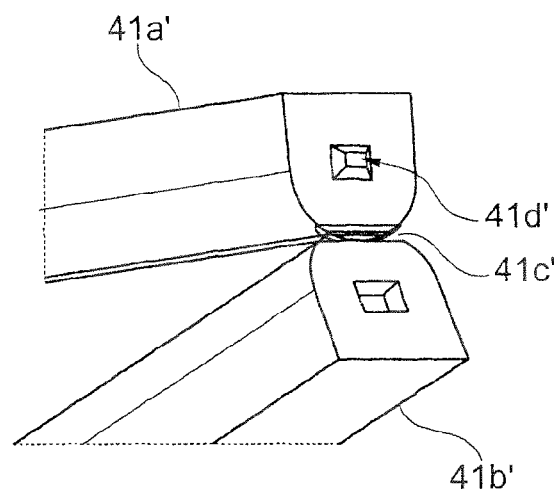

FIG. 10A to 10D show detail views of a modified electric drive 41' divided into two blocks 41*a'*, 41*b'* by a hinged connection 41*c'*. FIGS. 10B and 10C show how the two components 41*a'*, 41*b'* can be folded and collapsed into an easily transportable compact unit and FIG. 10D shows how both parts are electrically connected via a plug-in connection 41*d'*.

Figure 11:
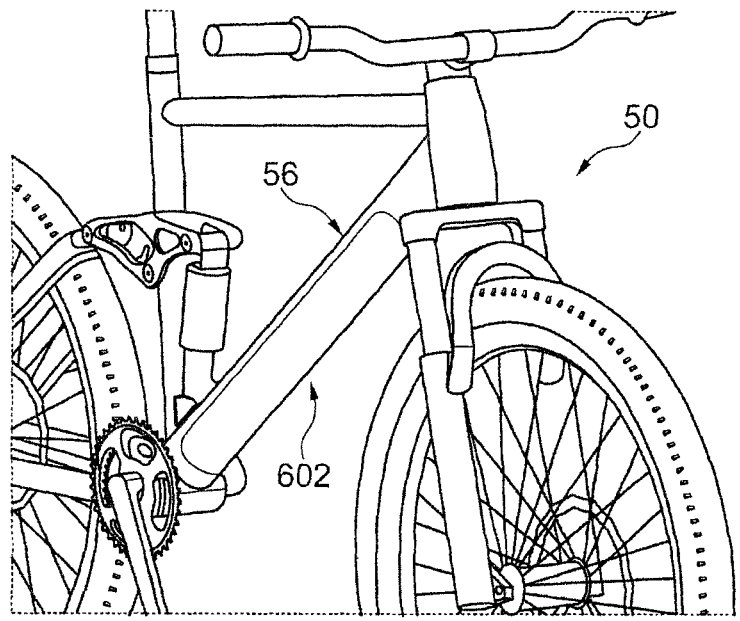
FIG. 11 shows a perspective view of a bicycle with an auxiliary motor or a panel.

FIG. 11 shows additional aspects of a design of the invention. A bicycle 50 that is preferably configured as a mountain bike is shown. Bicycle 50 has a frame section 54 that also includes a bottom tube 56. An auxiliary motor 60 is attached to the bottom tube 56. In the perspective view of FIG. 11, only a housing 602 of the potentially attached auxiliary motor 60 can be seen, which is configured to surround the components of an auxiliary motor 60 and protect it against external influences (moisture, heat, impacts, splashing water, etc.).

Figure 13A:
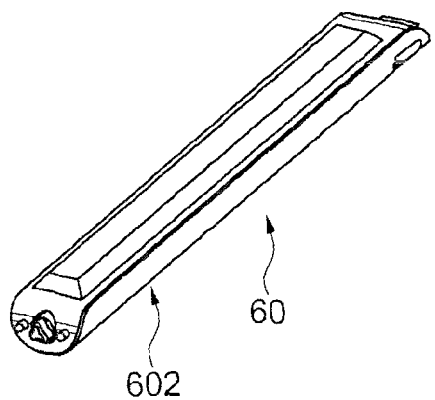
FIGS. 13a and 13b show top views of an auxiliary motor and a panel.
Figure 13B:
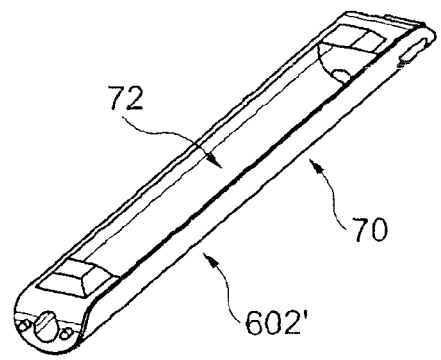

However, as an alternative to the auxiliary motor 60, a panel or an empty housing 70 as shown in FIG. 13*b* can be arranged or attached in the down tube 56. Panel 70 has a housing 602' that can be identical or similar to that of the housing 602 of the auxiliary motor 60. Contrary to the auxiliary motor 60, however, panel 70 does not have an energy storage device, a drive device and a transmission device. Panel 70 can therefore be clearly lighter than the auxiliary motor 60. Instead, the panel 70 preferably has a recess 72, which spans at least over a large part of the longitudinal direction and preferably also over a large part of the lateral direction of the panel. If arranged on a down tube 56 of a bicycle 50, preferably on a bottom side of the down tube 56, the recess 72 can form a cavity combined with an area of the down tube 56, which can be used or is designed to transport tools and/or supplies, for example, based on an appropriate distribution.

Figure 15A:
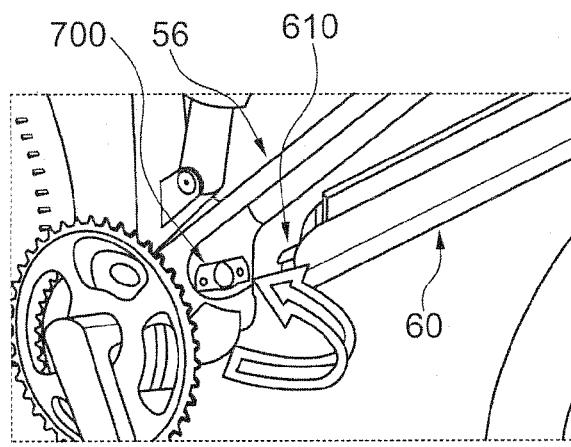
FIG. 15a to c show the assembly of an auxiliary motor.
Figure 15B:
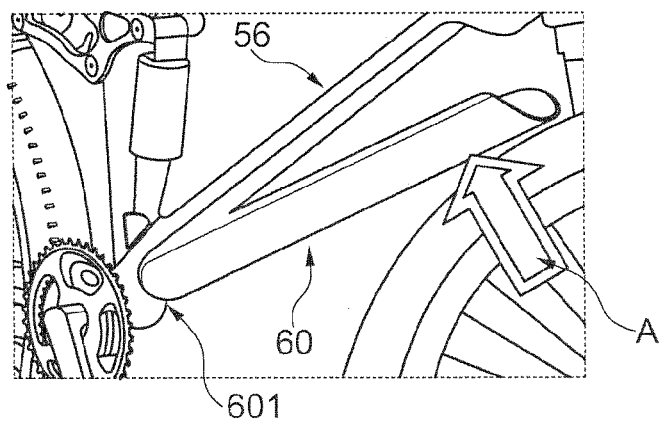
Figure 15C:
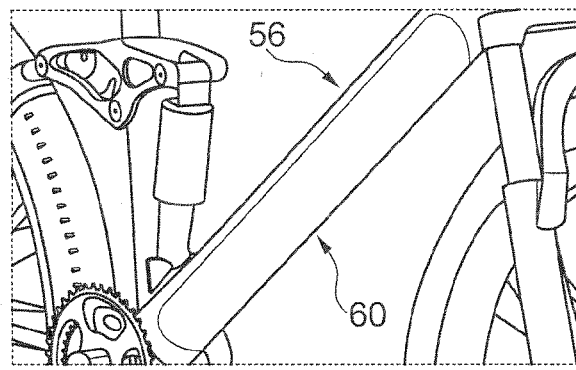

The bicycle or the bicycle frame has a down tube 56 as described above, which is designed to receive or attach an auxiliary motor and/or housing. The down tube preferably has a flat flat side, an indentation and/or a, for instance, T-, L-, V- or U-shaped cross-section (not shown or see FIG. 1 or 15*b*). Preferably, such a down tube forms a visual unit with the auxiliary motor or housing that is attached to the frame or the down tube.

Regardless whether the auxiliary motor 60, which is preferably designed compactly according to FIG. 13*a*, or the panel 70 is arranged at the down tube of the bicycle 50, it is especially preferred that the combination of down tube 56 and auxiliary motor 60 or panel 70 form a smooth transition, as shown in FIG. 11. It is also especially preferred that the frame 54 alone is supportive without auxiliary motor 60 and without panel 70. For example, this can be accomplished through a suitable material selection and a suitable dimensioning of the down tube. In other words, bicycle 50 could also be used without one of these two elements, even if it is preferred—for example, for practical and aesthetic reasons—that panel 70 or auxiliary motor 60 are always arranged on down tube 56 when the bicycle 50 is used. The smooth transition between down tube 56 and panel 70 or auxiliary motor 60 should be aesthetically attractive on one hand.

In other words, this transition can be designed so that the overall structure is similar or identical to a conventional bicycle down tube.

Figure 12:
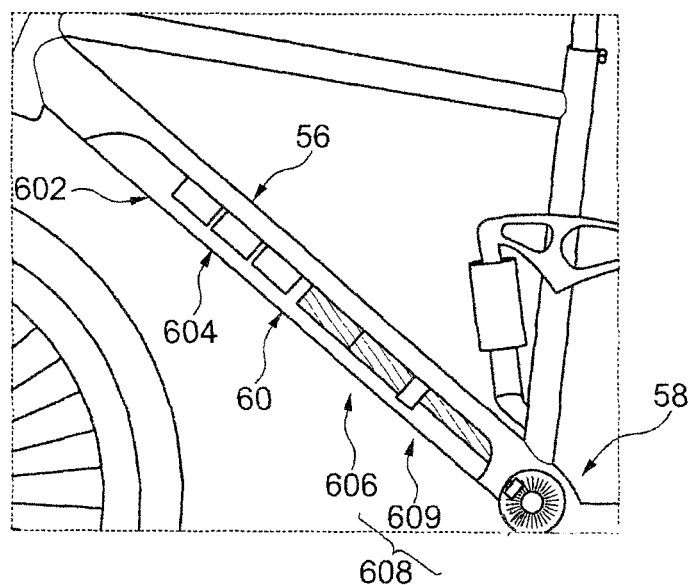
FIG. 12 shows a partial revision of a bicycle with an auxiliary motor according to a design form of the invention.
Figure 14:
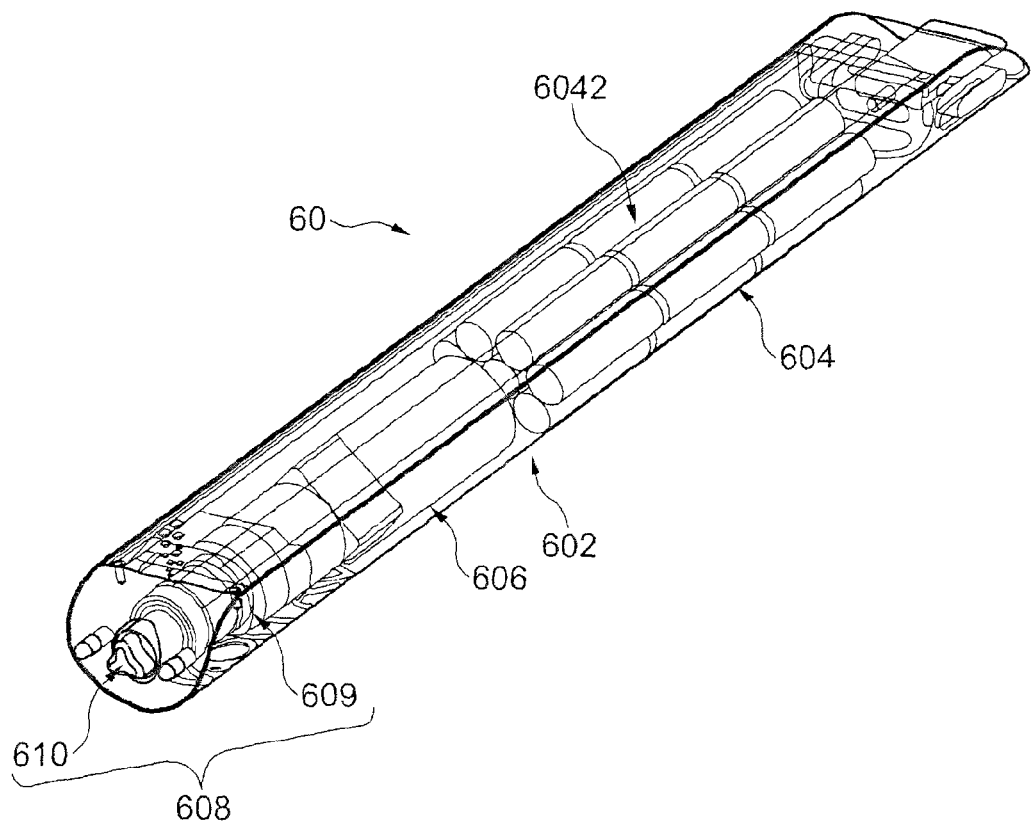
FIG. 14 shows a partially perspective revision of an auxiliary motor.
Figure 19:
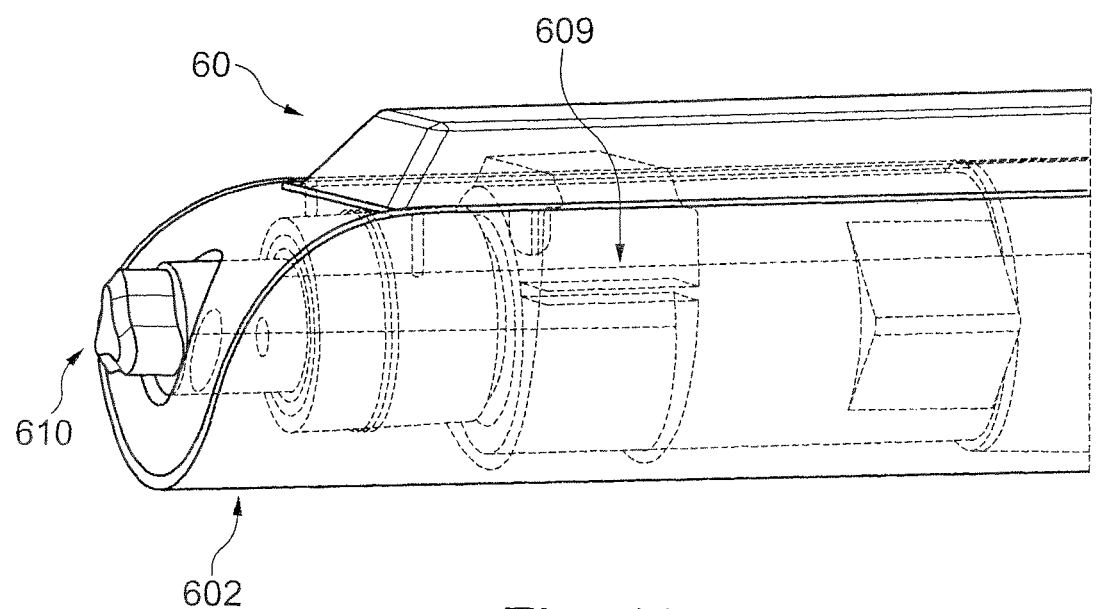
FIG. 19 shows an enlarged detail view of an area of the auxiliary motor in partial phantom view.

FIG. 12 shows a partially phantom view of an auxiliary motor 60, which is attached to a down tube 56 of a bicycle. As can be seen, the overall length of the auxiliary motor is less than approximately 90% of the down tube. In addition to the previously described housing 602, which preferably forms a smooth transition with the down tube 56, auxiliary motor 60 comprises an energy storage device, which is a battery/rechargeable battery pack 604, a drive device 606 and a transmission device 608 in the example shown. According to FIG. 14, which shows the partial phantom view of an auxiliary motor, the battery/rechargeable battery pack 604 has multiple batteries/rechargeable batteries 6042 that are arranged successively and/or side-by-side, wherein the longitudinal axes of the batteries/rechargeable batteries 6042 are particularly preferably essentially parallel with the longitudinal axis of the auxiliary motor. The terms batteries and rechargeable batteries are used interchangeably in the following. Whenever a battery is mentioned, the expert knows that he could also use a rechargeable battery instead (and reverse), provided nothing else is explicitly pointed out or the functional context results in something else. The drive device 606, which can be an electric drive in the example listed here, is configured to convert the energy stored in the batteries into kinetic energy. The drive device 606 produces a rotation movement from the energy stored in the batteries. This can be transmitted to a pedal crank spindle of a bicycle via a transmission device 608. The transmission device includes a transmission segment or transmission portion 609 according to FIGS. 12 and 14, which is arranged within the housing 602 (see also FIG. 19). This transmission segment 609 is designed to transmit the rotation produced by the drive device 606 to a transmission adapter 610. Transmission adapter 610 slightly projects over the housing 602 in longitudinal direction, i.e. a few millimeters, for example, at least 3 mm, 5 mm or 7 mm up to a few centimeters, for example, a maximum of 1 cm, 1.5 cm or 2.5 cm. The adapter has an untrue cross-section—for example, it can be polygonal rounded or star-shaped rounded with suitable extensions. Other untrue shapes are also possible.

Figures 17A, 17B:
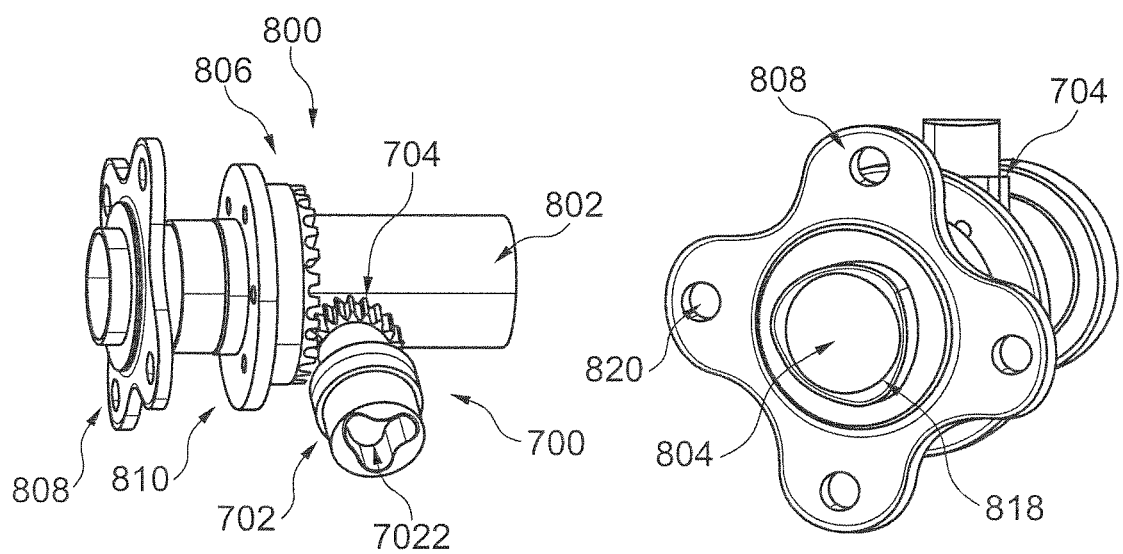
FIGS. 17a and b show drive adapters operatively engaged with a rotation transmission unit.
Figure 18:
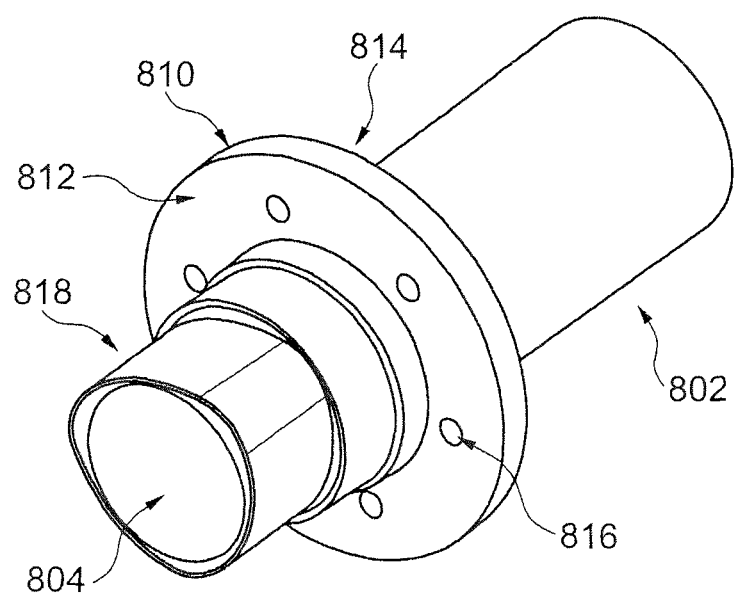
FIG. 18 shows a perspective, schematic view of a drive adapter.

The drive adapter 610 is designed to engage with a rotation transmission unit 700, which is shown in FIG. 17*a*. The rotation transmission unit 700 is arranged in a suitable opening between down tube 56 and a bottom bracket shell 58 of the bicycle 50. The rotation transmission unit 700 has a receiving area 702 for receiving the transmission adapter 610 and a gear 704 for transmitting a torque to another gear or a shaft. The mounting area 702 has a recess 7022 for the flush or positive locked mounting of the drive adapter 610. Of course, it is clear that the drive adapter 610 has a recess and the rotation transmission unit has a projecting area, so long as these can be brought together flush in engagement.

Such a configuration can now provide an especially easy assembly or attachment of an auxiliary motor 60 to a down tube 56, for example, as illustrated in the figure series 15a to 15c. In a first step, the longitudinal end of the auxiliary motor 60, to which the transmission adapter 610 is arranged, can be arranged on a down tube 56 of the bicycle. The transmission adapter 610 of the auxiliary motor 60 can engage with the rotation transmission unit 700, which is arranged between the down tube 56 and the bottom bracket shell 58. In a further step, the remaining areas of the auxiliary motor 60 are then connected with the down tube 56, wherein this occurs preferably in a rotational movement around the first attached end area 601 of the auxiliary motor 60 as indicated by arrow A in FIG. 15b. Preferably three recesses are provided on the frame which suitable projections or snap-in pins on the down tube snap into. This preferably occurs audibly or by a "clicking" noise, which signals a secure engagement.

An especially easy assembly can be guaranteed here, also by the end user. Similarly, a panel 70 can also be affixed on the down tube and a panel 70 or an auxiliary motor 60 can be dismantled from the bicycle 50 in reverse order. This provides an easy and user-friendly assembly and dismantling of the auxiliary motor 60 and the panel 70. The user can hereby quickly decide if he wants to use the bicycle 50 with or without the auxiliary motor 60.

Figure 16:
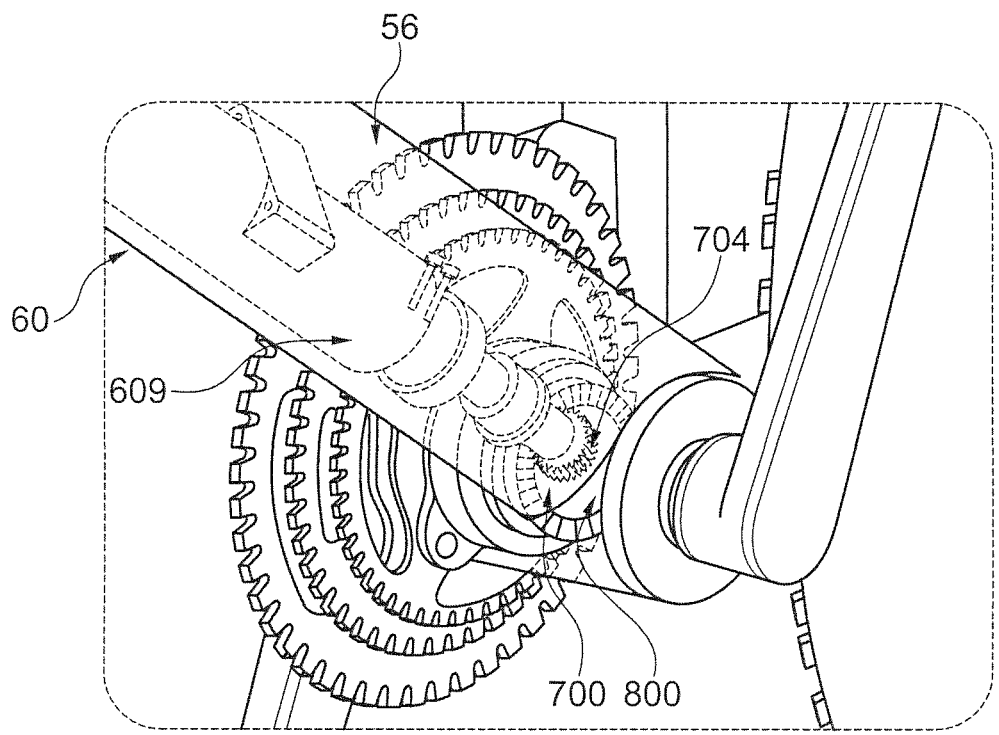
FIG. 16 shows a partially perspective phantom view of a partial area of an auxiliary motor, a rotation transmission unit and a drive crank adapter, which is arranged in the bottom bracket shell of a bicycle.

FIG. 16 shows a partial phantom view of an arrangement in which the auxiliary motor 60 is assembled on a down tube 56 of a bicycle and is in operative connection with a drive adapter 800 of the invention via the rotation transmission unit 700. The drive adapter 800 has a hollow axle 802 that is designed to coaxially surround a partial area of a pedal crank spindle or be attached to this. In other words, an inner cavity 804 of the hollow axle 802 can therefore receive a pedal crank spindle of a bicycle. Furthermore, the drive adapter 800 has a gear 806, which is designed to be effectively or operatively connected with the gear or pinion 704 of the rotation transmission unit 700. Furthermore, the drive adapter 800 has a flange 808, which can be attached on a pedal crank and preferably on a sprocket wheel of a bicycle.

Gear 806 is preferably configured as sprocket. Particularly preferred, the drive adapter 800 has a collar area 810, which is firmly connected with the hollow axle or shaft 802 or is integrally formed with it. The collar area 810 preferably has a clearly larger diameter than the hollow shaft 802, for example its diameter is at least approx. 120%, 150% or 200% of the diameter of the hollow axle. The collar area 810 therefore has two surfaces 812, 814 that are essentially perpendicular to the rotational axis of the hollow shaft 802. It is preferable that the collar area 810 be relatively thin, for example it has a thickness or depth of less than 10 mm, preferably less than 7 and especially preferred less than 5 mm. Especially preferred is that gear 806 is attached to one of these surfaces 812, 814. For example, this may occur by attaching various screws, specifically threaded screws through openings 816. This guarantees an excellent and secure attachment of the gear 806 to the hollow axle 802.

It is furthermore preferred that the hollow axle 802 has an untrue cross section on at least one end area 818 in longitudinal direction. In the configuration shown, the outer profile of the cross-section of the end area 818 is essentially a rounded triangle, which is preferably milled into the hollow axle. Flange 808 has an appropriate opening for the untrue cross-section of the end area 818. The drive adapter 800 and flange 808 can hereby be connected flush together.

The flange 808 is designed to be attached on a pedal crank, preferably on a sprocket wheel of a bicycle. The flange 808 can hereby have holes 820 for attaching screws with which the flange 808 can be attached to a sprocket wheel.

During the operation, the energy stored by the storage device 604 (for example, electrical energy stored by rechargeable batteries) is converted by the drive device 606 into kinetic energy, specifically into a rotation movement. This is then transmitted to the gear 806 of the drive adapter 800 via the transmission device 608, especially via the transmission segment 609, the transmission adapter 610 and the rotation transmission unit 700. This transmits the rotation to the flange 808 and further to a sprocket wheel of the bicycle, which powers a gear on a rear wheel of the bicycle via a chain.

In a particularly preferred configuration, an energy transmission is also possible in the other direction. In such a configuration, a bicycle, for example, as shown in FIG. 6, can be "jacked up." The wheels are specifically not directly in contact with the floor. A user can effect a rotation movement of the sprocket wheel via the pedals without moving the bicycle. This rotation can be transmitted to the hollow axle 802 and therefore the drive adapter 800 via the flange 808 that is attached to the sprocket wheel. This can transmit the rotation via the gear 806 and the rotation transmission unit 700 to the transmission device 608 and the drive device 606. This is designed in this especially preferred configuration to convert the mechanical rotation energy into energy that is stored by the energy storage device. For example, the drive device 606 can use the rotation energy to separate charges and thereby charge the rechargeable batteries. This storable energy is then stored by the energy storage device. This configuration example allows the user to charge the energy storage devices by using the user's own mechanical activity.

It is obvious for the expert that the individual characteristics described in conjunction with the various preferred exemplary configurations can also be provided in other configurations or be combined with these.

The invention also includes the precise or exact terms, characteristics, numerical values or areas, etc. if these terms, characteristics, numerical values or areas are previously or afterward mentioned in conjunction with terms such as "about, approx., around, essentially, in general, at least," etc. (therefore "about 3" should also include "3" or "essentially radial" should also include "radial"). The term "or" also means "and/or."

This execution of the invention is not limited to the examples shown in the figures and explained above under emphasised aspects, but is also possible in a multitude of deviations, which are within the scope of proper handling.

The invention claimed is:

1. An auxiliary motor for a bicycle, the auxiliary motor comprising:
   an energy storage device for storing energy;
   a drive device for converting the energy stored in the energy storage device into kinetic energy;
   a transmission device for transmitting the kinetic energy; and
   a housing that is designed to at least partially surround the energy storage device and the drive device in a circumferential direction and at least essentially completely span the energy storage device and the drive device in a longitudinal direction, wherein the auxiliary motor is designed to be received in a recessed area of a down tube of the bicycle, said recessed area being open on a bottom side of the down tube, wherein the auxiliary motor is designed to be received in the recessed area and at least essentially parallel to the down tube, wherein the energy storage device and the drive device can be positioned successively in a longitudinal direction of the down tube, wherein the energy storage device and the drive device together at least do not project over a length of the down tube, and wherein at least a portion of the housing of the auxiliary motor forms at least a portion of an outer side surface of the down tube, when the auxiliary motor is received in the recessed area of the down tube.

2. The auxiliary motor according to claim 1, wherein the auxiliary motor does not exceed a width of 9 cm in a random sectional plane perpendicular to the longitudinal direction of the housing.

3. The auxiliary motor according to claim 1, wherein the housing is designed to be attached to the down tube at different points.

4. The auxiliary motor according to claim 1, wherein the transmission device includes a transmission portion arranged within the housing.

5. The auxiliary motor according to claim 1, wherein the auxiliary motor is adapted to snap fit into the recessed area.

6. The auxiliary motor according to claim 1, wherein the recessed area of the down tube is provided in a side wall of the down tube.

7. The auxiliary motor according to claim 1, wherein the housing is configured for being attached to and detached from the down tube.

8. A bicycle, comprising:
an auxiliary motor, comprising:
an energy storage device for storing energy;
a drive device for converting the energy stored in the energy storage device into kinetic energy;
a transmission device for transmitting the kinetic energy;
a housing that is designed to at least partially surround the energy storage device in a circumferential direction and at least essentially completely span the energy storage device and the drive device in a longitudinal direction, and
a down tube having a recessed area that is open toward a bottom,
wherein the auxiliary motor is received in the recessed area at least essentially parallel to the down tube,
wherein the energy storage device and the drive device can be positioned successively in a longitudinal direction of the down tube,
wherein the energy storage device and the drive device together at least do not project over a length of the down tube, and
wherein at least a portion of the housing of the auxiliary motor forms at least a portion of an outer side surface of the down tube, when the auxiliary motor is received in the recessed area of the down tube.

9. The bicycle according to claim 8, wherein a down tube structure results from a combination of the auxiliary motor and the down tube, which does not exceed a width of 9 cm in a sectional plane perpendicular to a longitudinal axis of the down tube.

10. The bicycle according to claim 8, wherein the down tube is supportive without the auxiliary motor.

* * * * *